(12) United States Patent
Nylander et al.

(10) Patent No.: US 8,848,855 B2
(45) Date of Patent: Sep. 30, 2014

(54) SEISMICALLY ISOLATED CONTAINMENT VESSEL

(75) Inventors: James Allan Nylander, Tualatin, OR (US); John T. Groome, Corvallis, OR (US); Eric Paul Young, Corvallis, OR (US)

(73) Assignee: NuScale Power, LLC, Corvallis, OR (US)

( * ) Notice: Subject to any disclaimer, the term of this patent is extended or adjusted under 35 U.S.C. 154(b) by 253 days.

(21) Appl. No.: 12/272,235

(22) Filed: Nov. 17, 2008

(65) Prior Publication Data

US 2010/0124304 A1 May 20, 2010

(51) Int. Cl.
*G21C 13/024* (2006.01)
*G21C 1/32* (2006.01)

(52) U.S. Cl.
CPC ............... *G21C 13/024* (2013.01); *Y02E 30/40* (2013.01); *G21C 1/322* (2013.01)
USPC .......................................... 376/293; 376/294

(58) Field of Classification Search
USPC .......................................... 376/293, 294, 273
See application file for complete search history.

(56) References Cited

U.S. PATENT DOCUMENTS

| | | | | |
|---|---|---|---|---|
| 3,599,589 A | * | 8/1971 | Busey | 114/264 |
| 3,865,688 A | * | 2/1975 | Kleimola | 376/283 |
| 4,064,005 A | * | 12/1977 | Baujat | 376/461 |
| 4,081,323 A | * | 3/1978 | Gans et al. | 376/293 |
| 4,179,104 A | * | 12/1979 | Skinner et al. | 267/154 |
| 4,258,937 A | * | 3/1981 | Barneoud et al. | 285/61 |
| 4,581,199 A | * | 4/1986 | Bioret et al. | 376/285 |
| 4,755,349 A | * | 7/1988 | Canini et al. | 376/285 |
| 5,024,804 A | * | 6/1991 | Blaushild | 376/285 |
| 5,087,408 A | * | 2/1992 | Tominaga et al. | 376/283 |
| 5,152,253 A | * | 10/1992 | Jenko et al. | 122/510 |
| 5,276,720 A | * | 1/1994 | Oosterkamp et al. | 376/283 |
| 5,434,894 A | * | 7/1995 | Chiang et al. | 376/203 |
| 5,740,216 A | * | 4/1998 | Morishita | 376/285 |
| 6,160,864 A | * | 12/2000 | Gou et al. | 376/285 |
| 6,795,518 B1 | * | 9/2004 | Conway et al. | 376/283 |
| 8,424,253 B2 | * | 4/2013 | Loewen et al. | 52/167.4 |

FOREIGN PATENT DOCUMENTS

| | | | |
|---|---|---|---|
| DE | 2642352 | * | 3/1978 |
| DE | 3221860 | * | 12/1983 |
| GB | 1510753 | * | 5/1978 |
| GB | 1510753 A | * | 5/1978 |
| JP | 51137089 | * | 11/1976 |
| JP | 51137089 A | | 11/1976 |
| JP | 58099793 | * | 6/1983 |

(Continued)

OTHER PUBLICATIONS

Modro et al., "Multi-Application Small Light Water Reactor Final Report," Dec. 2003.*

(Continued)

*Primary Examiner* — Jack W Keith
*Assistant Examiner* — Sean P Burke
(74) *Attorney, Agent, or Firm* — Fish & Richardson P.C.

(57) ABSTRACT

A power module includes a containment vessel completely submerged in a pool of liquid, and a support structure located at or above an approximate midpoint of the containment vessel, or center of gravity of the power module. The power module is supported by the support structure in combination with a buoyancy force of the pool of liquid acting on the containment vessel.

19 Claims, 5 Drawing Sheets

(56) References Cited

FOREIGN PATENT DOCUMENTS

| | | | |
|---|---|---|---|
| JP | 58099793 A | | 6/1983 |
| JP | 62187289 | * | 8/1987 |
| JP | 62187289 A | | 8/1987 |
| JP | 04053598 | * | 5/1992 |
| JP | 04053598 U | | 5/1992 |
| JP | 11153184 | * | 6/1999 |
| JP | 11351325 | * | 12/1999 |
| JP | 11351325 A | | 12/1999 |
| JP | 2000055119 | * | 2/2000 |
| JP | 2000055119 A | | 2/2000 |
| JP | 2001073391 | * | 3/2001 |
| JP | 2001073391 A | | 3/2001 |
| JP | 2001323686 | * | 11/2001 |
| JP | 2001323686 A | | 11/2001 |
| JP | 2006125183 | * | 5/2006 |
| JP | 2006125183 A | | 5/2006 |
| WO | 2009064654 | | 5/2009 |
| WO | WO2009064654 | * | 5/2009 |

OTHER PUBLICATIONS

Communication pursuant to Article 94(3) EPC, Manini, Adriano, May 2, 2012, European Patent Office 09760394.8-2208, 5 pages.*
IAEA, "IAEA Techdoc 1391—Status of Advanced Light Water Reactor Designs 2004," May 2004, pp. 279-306, 489-512, Nuclear Power Technology Development Section, International Atomic Energy Agency, Vienna, Austria.*
IAEA, "IAEA Techdoc 1485—Status of Innovative Small and Medium Sized Reactor Designs 2005," Mar. 2006, pp. 93-162, Nuclear Power Technology Development Section, International Atomic Energy Agency, Vienna, Austria.*
International Search Report for PCT/US2009/064849, Mar. 8, 2010.*
Modro, S.M. et al., "Multi-Application Small Light Water Reactor Final Report," Idaho National Engineering and Environmental Laboratory, Dec. 2003. Idaho Falls, ID USA.*
Office Action for related Canadian application, May 31, 2013 for Application No. 2,745,581 4 pages.*
Office Action for related Chinese application, Aug. 20, 2013 for Application No. 200980153545.3, 25 pages.*
Office Action for related Chinese application, Apr. 25, 2014 for Application No. 200980153545.3, 5 pages.*
Office Action for related EPO application, Apr. 24, 2014 for Application No. 09760394, 7 pages.*
Office Action for related Japanese application, Feb. 12, 2014 for Application No. 2011-536607 3 pages.*
Office Action for related Korean application, Jun. 28, 2013 for Application No. 10-2011-7013844 7 pages.*
Office Action for related Korean application, Dec. 23, 2013 for Application No. 10-2011-7013844 3 pages.*
Office Action for related Korean application, Feb. 27, 2014 for Application No. 10-2011-7013844 3 pages.*
Reyes, "Nuscale Power Introduction to Nuscale Design," Jul. 24, 2008, http://www.nuscale.com/pdf/NRC_preapp_mtg_072.*
Reyes et al., "Testing of Multi-Application Small Light Water Reactor (MASLWR Passive Safety Systems," Nuclear Engineering and Design, Amsterdam, NL v. 237 No. 18, Aug. 25, 2007.*
Reyes et al.; "Testing of the multi-application small light water reactor (MASLWR) passive safety systems" Nuclear Engineering and Design, Amsterdam, NL, vol. 237 No. 18, Aug. 25, 2007.
Modro, S.M., et al.; 'Multi-Application Small Light Water Reactor Final Report; Idaho National Engineering and Environmental Laboratory; Dec. 2003; Idaho Falls, ID, U.S.A.
IAEA; IAEA Tecdoc 1391—Status of Advanced Light Water Reactor Designs 2004; May 2004; pp. 279-306, 489-512; Nuclear Power Technology Development Section, International Atomic Energy Agency; Vienna; Austria.
IAEA; IAEA Tecdoc 1485—Status of Innovative Small and Medium Sized Reactor Designs 2005; Mar. 2006; pp. 93-162; Nuclear Power Technology Development Section, International Atomic Energy Agency; Vienna; Austria.
Reyes, Jose N., "Nuscale Power Introduction to Nuscale Design", Jul. 24, 2008, http://www.nuscalepower.com/pdf/NRC_preapp_mtg_072.
International Search Report for PCT/US2009/064849; Mar. 8, 2010.
Communication pursuant to Article 94(3) EPC; Manini, Adriano ; May 2, 2012; European Patent Office (EPO); 09760394.8-2208; 5 pages.
Korean Intellectual Property Office, Notice of Non-Final Rejection issued Jun. 28, 2013 for Application No. 10-2011-7013844, 7 pages.
Canadian Intellectual Property Office, Examination Report issued May 31, 2013 for Application No. 2,745,581, 4 pages.
State Intellectual Property Office of the People's Republic of China, First Office Action issued Aug. 20, 2013 for Application No. 2009801535453, 25 pages.
"Patent Document Bulletin-Atomic Energy", edited by CIAE, vol. 5, Dec. 31, 1989, p. 164.
State Intellectual Property Office of the People's Republic of China, Second Office Action issued Apr. 25, 2014 for Application No. 200980153545.3, including English translation thereof (8 pages), 5 pages.
European Patent Office, Communication pursuant to Rule 71(3), EPC, Intention to Grant issued Apr. 24, 2014 for Application 09760394.8; 7 pages.
Korean Intellectual Property Office, Notice of Final Rejection issued Dec. 23, 2013 for Application No. 10-2011-7013844, including English translation thereof (3 pages), 3 pages.
Japan Patent Office, Notices of Reasons for Rejection issued Feb. 12, 2014 for Application NL. 2011-536607, including English translation thereof (3 pages), 3 pages.
Korean Intellectual Property Office, Notice of Second Final Rejection issued Feb. 27, 2014 for Application No. 10-2011-7013844, including English translation thereof (3 pages), 3 pages.

* cited by examiner

SEISMICALLY ISOLATED CONTAINMENT VESSEL

TECHNICAL FIELD

The invention relates to the field of power generation, including power module structures and support systems.

BACKGROUND

In nuclear reactors designed with passive operating systems, the laws of physics are employed to ensure that safe operation of the nuclear reactor is maintained during normal operation or even in an emergency condition without operator intervention or supervision, at least for some predefined period of time. A nuclear reactor 5 includes a reactor core 6 surrounded by a reactor vessel 2. Water 10 in the reactor vessel 2 surrounds the reactor core 6. The reactor core 6 is further located in a shroud 122 which surround the reactor core 6 about its sides. When the water 10 is heated by the reactor core 6 as a result of fission events, the water 10 is directed from the shroud 122 and out of a riser 124. This results in further water 10 being drawn into and heated by the reactor core 6 which draws yet more water 10 into the shroud 122. The water 10 that emerges from the riser 124 is cooled down and directed towards the annulus 123 and then returns to the bottom of the reactor vessel 2 through natural circulation. Pressurized steam 11 is produced in the reactor vessel 2 as the water 10 is heated.

A heat exchanger 135 circulates feedwater and steam in a secondary cooling system 130 in order to generate electricity with a turbine 132 and generator 134. The feedwater passes through the heat exchanger 135 and becomes super heated steam. The secondary cooling system 130 includes a condenser 136 and feedwater pump 138. The steam and feedwater in the secondary cooling system 130 are isolated from the water 10 in the reactor vessel 2, such that they are not allowed to mix or come into direct contact with each other. The secondary cooling system 130 may comprise piping 139 for transporting steam or feedwater.

The reactor vessel 2 is surrounded by a containment vessel 4. The containment vessel 4 is designed so that water or steam from the reactor vessel 2 is not allowed to escape into the surrounding environment. A steam valve 8 is provided to vent steam 11 from the reactor vessel 2 into an upper half 14 of the containment vessel 4. A submerged blowdown valve 18 is provided to release the water 10 into suppression pool 12 containing sub-cooled water.

Piping 139 and other connections are provided between the nuclear reactor 5 and the secondary cooling system 130 or other systems in the power generation facility. In the event of an earthquake or other seismic activity, significant forces or vibration may be transferred to, or by, the connections, which can place great stress on the connections. Forces resulting from thermal expansion also place stress on the connections. Maintaining integrity of these connections helps discourage the inadvertent release of radioactive or other materials from the various systems, and reduces maintenance or damage that might otherwise occur if one or more of the connections fail. The present invention addresses these and other problems.

SUMMARY OF THE INVENTION

A power module is disclosed herein, as comprising a containment vessel completely submerged in a pool of liquid, and a support structure located at or above an approximate midpoint of the containment vessel, or center of gravity of the power module. The power module is supported by the support structure in combination with a buoyancy force of the pool of liquid acting on the containment vessel.

A support structure for a containment vessel is disclosed herein, as comprising a support arm located at or above an approximate midpoint or center of gravity of the containment vessel, and a mounting structure submerged in water. The support structure further comprises a damping device disposed between the support arm and the mounting structure, wherein least a portion of the weight of the containment vessel is transferred to the mounting structure through the damping device. The damping device is configured to attenuate seismic forces transferred to the support arm.

A system is disclosed herein, as comprising means for supporting a power module on a support structure, wherein the support structure is located at or above an approximate midpoint or center of gravity of the power module, and means for allowing a constrained rotation of the power module, wherein the support structure serves as a pivot for the rotation. The system further comprises means for damping seismic forces transmitted through the support structure to the power module.

The invention will become more readily apparent from the following detailed description of a preferred embodiment of the invention which proceeds with reference to the accompanying drawings.

DESCRIPTION OF EXAMPLE EMBODIMENTS

Various embodiments disclosed or referred to herein may be operated consistent, or in conjunction, with features found in co-pending U.S. application Ser. No. 11/941,024 which is herein incorporated by reference in its entirety.

Figure 2:
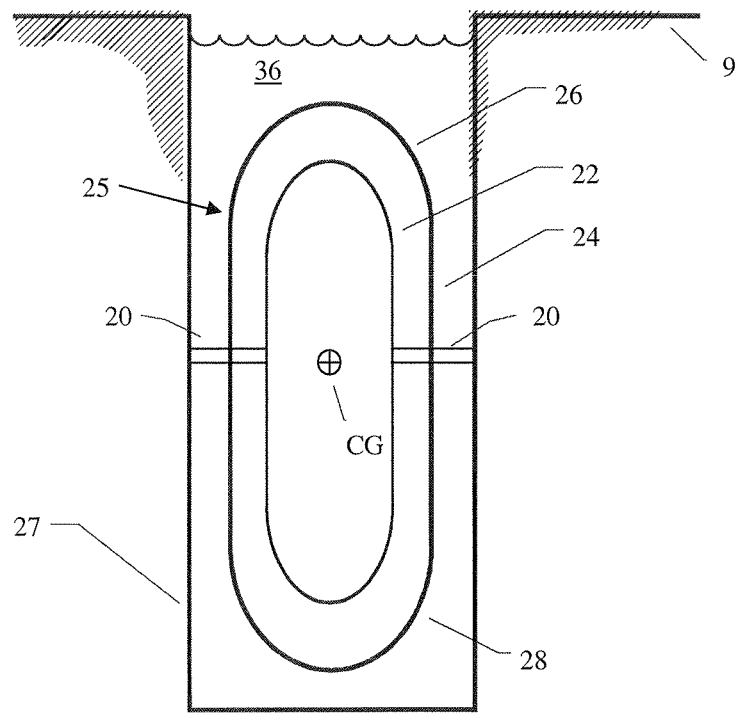
FIG. 2 illustrates an example power module assembly comprising a support structure.

FIG. 2 illustrates an example power module assembly comprising a containment vessel 24, reactor vessel 22 and a support structure 20. The containment vessel 24 is cylindrical in shape, and has ellipsoidal, domed or hemispherical upper and lower ends 26, 28. The entire power module assembly 25 may be submerged in a pool of liquid 36 (for example, water) which serves as an effective heat sink. The pool of liquid 36 is retained in reactor bay 27. The reactor bay 27 may be comprised of reinforced concrete or other conventional materials. The pool of liquid 36 and the containment vessel 24 may further be located below ground 9. The upper end 26 of the containment vessel 24 may be located completely below the surface of the pool of liquid 36. The containment vessel 24 may be welded or otherwise sealed to the environment, such that liquids and gas do not escape from, or enter, the power module assembly 25.

The containment vessel 24 is shown suspended in the pool of liquid 36 by one or more support structures 20, above a lower surface of the reactor bay 27. The containment vessel 24 may be made of stainless steel or carbon steel, and may include cladding. The power module assembly 25 may be sized so that it can be transported on a rail car. For example, the containment vessel 24 may be constructed to be approximately 4.3 meters in diameter and 17.7 meters in height (length). Refueling of the reactor core 6 (FIG. 1) may be performed by transporting the entire power module assembly 25 by rail car or overseas, for example, and replacing it with a new or refurbished power module assembly which has a fresh supply of fuel rods.

Figure 1:
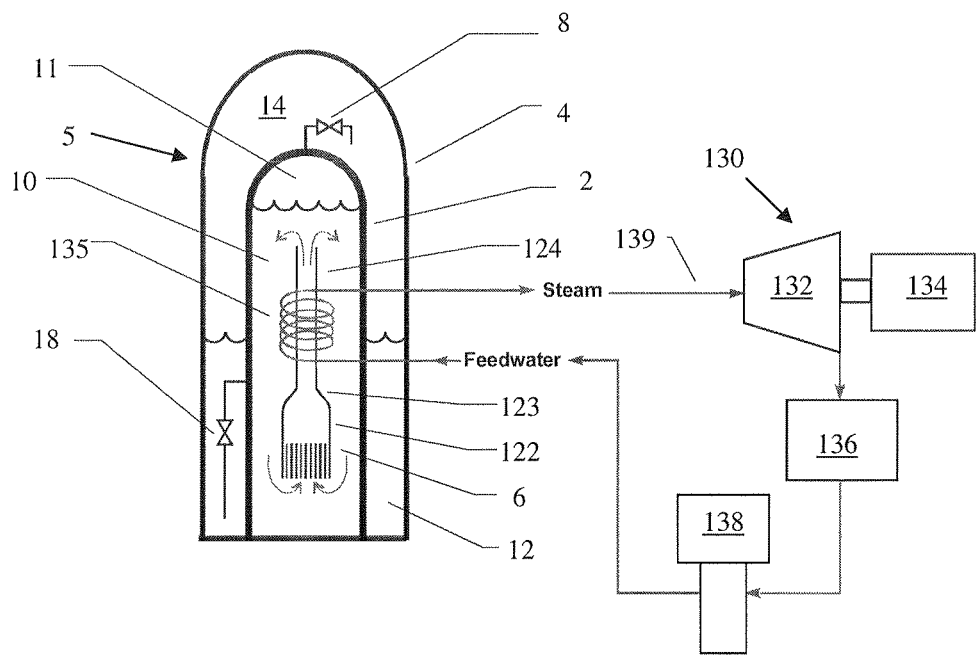
FIG. 1 illustrates a nuclear power system.

The containment vessel 24 encapsulates and, in some conditions, cools the reactor core 6 (FIG. 1). The containment vessel 24 is relatively small, has a high strength and may be capable of withstanding six or seven times the pressure of conventional containment designs in part due to its smaller overall dimensions. Given a break in the primary cooling system of the power module assembly 25 no fission products are released into the environment.

The power module assembly 25 and containment vessel 24 are illustrated as being completely submerged in the pool of liquid 36. All sides, including the top and bottom, of the containment vessel 24 are shown as being in contact with, and surrounded by, the liquid 36. The one or more support structures 20 are located at an approximate midpoint of the containment vessel 24. In one embodiment, the one or more support structures 20 are located at an approximate center of gravity (CG), or slightly above the CG, of the power module 25. The power module 25 is supported by the support structure 20 in combination with a buoyancy force of the pool of liquid 36 acting on the containment vessel 24. In one embodiment, the power module assembly 25 is supported by two support structures 20; the first support structure located on a side of the power module assembly 25 opposite the second support structure.

The one or more support structures 20 may be configured to support both the containment vessel 24 and the reactor vessel 22. In one embodiment, the one or more support structures 20 are located at an approximate CG, or slightly above the CG, of the reactor vessel 22.

Figure 3:
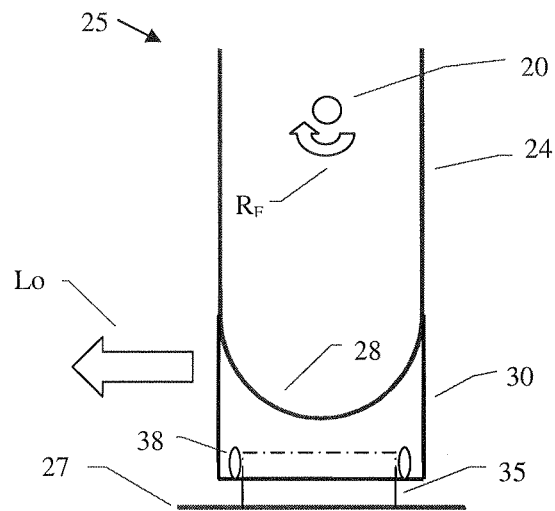
FIG. 3 illustrates a side view of the power module assembly of FIG. 2.

FIG. 3 illustrates a side view of the power module assembly 25 of FIG. 2. The containment vessel 24 as well as the reactor vessel 22, may be configured to pivot about the support structure 20, due to a rotational force RF acting on the power module 25. In one embodiment, the support structure 20 is located slightly above the CG of the power module 25, so that the lower end 28 tends to return to a bottom facing position within the reactor bay 27 due to gravity after the rotational force RF has subsided. The rotation of the containment vessel 24 also allows for greater maneuverability during installation or removal of the power module assembly 25 from the reactor bay 27. In one embodiment, the containment vessel 24 may be rotated between a vertical and a horizontal orientation or position of the power module assembly 25.

The power module 25 is further illustrated as comprising a base skirt 30 located at the lower end 28 of the containment vessel 24. The base skirt 30 may be rigidly mounted to, welded on, or be an integral part of, the containment vessel 24. In one embodiment, the base skirt 30 is designed to support the weight of the power module 25 if the base skirt 30 is placed on the ground, on a transport device, or in a refueling station, for example. During normal operation (e.g. power operation) of the power module 25, the base skirt 30 may be suspended off the ground or positioned above the bottom of the reactor bay 27, such that the base skirt 30 is not in contact with any exterior component or surface.

When the power module 25 rotates about the support structure 20, the lower end 28 of the containment vessel 25 tends to move in a lateral or transverse direction Lo. The base skirt 30 is configured to contact an alignment device 35 located in the pool of liquid 36 when the containment vessel 24 pivots a predetermined amount about the support structure 20. For example, the alignment device 35 may be sized so that the power module 25 is free to rotate within a range of motion or particular angle of rotation.

The alignment device 35 may comprise an exterior diameter that is smaller than an interior diameter of the base skirt 30. The alignment device 35 may be sized to fit within the base skirt 30, such that the base skirt 30 does not contact the alignment device 35 when the power module 25 is at rest. In one embodiment, the base skirt 30 contacts the alignment device 35 when the containment vessel 24 pivots about the support structure 20. The base skirt 30 may not inhibit a vertical range of motion of the containment vessel 23, in the event that a vertical force acts upon the power module 25. The alignment device 35 may be rigidly mounted (e.g. bolted, welded or otherwise attached) to the bottom of the reactor bay 27. In one embodiment, one or more dampeners 38 are located between the base skirt 30 and the alignment device 35 to attenuate a contact force between the base skirt 30 and the alignment device 35 when the power module 25 pivots or rotates. The one or more dampeners 38 may be mounted to or otherwise attached to either the alignment device 35 (as illustrated) or the base skirt 30.

Figure 4:
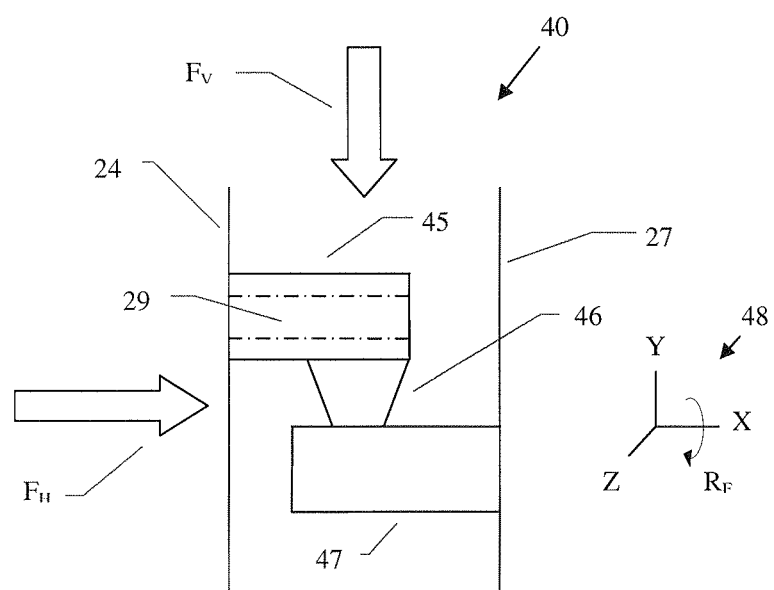
FIG. 4 illustrates a partial view of an example support structure for a power module assembly comprising a seismically isolated containment vessel.

FIG. 4 illustrates a partial view of an example support structure 40 for a power module assembly comprising a seismically isolated containment vessel 24. The support structure 40 comprises a support arm 45 and a mounting structure 47. The support arm 45 may be located at an approximate midpoint of the containment vessel 24. The mounting structure 47 is submerged in liquid (for example water), wherein the liquid surrounds the containment vessel 24. The mounting structure 47 may be an extension of, mounted to, recessed in, or integral with, the wall of the reactor bay 27 (FIG. 2).

A damping device 46 is disposed between the support arm 45 and the mounting structure 47. At least a portion of the weight of the containment vessel 24 is transferred to the support structure 47 through the damping device 46. Damping device 46 may be elastic, resilient or deformable, and may comprise a spring, pneumatic or hydraulic shock absorber, or other vibration or force attenuating device known in the art. In one embodiment, the damping device 46 comprises natural or synthetic rubber. The damping device 46 may comprise an elastic material that is manufactured from petroleum or other chemical compounds and that is resistant to material breakdown when exposed to radiation or humidity. In yet another embodiment, the damping device 46 comprises soft deformable metal or corrugated metal.

The damping device 46 is configured to attenuate dynamic or seismic forces transferred by and between the support arm 45 and the mounting structure 47. For example, a vertical or longitudinal force FV, acting along a longitudinal or lengthwise direction of the containment vessel 24, may act through the damping device 46. Additionally, a horizontal or transverse force FH may be exerted on the damping device 46 in any direction perpendicular to the longitudinal force FV. Transverse force FH may be understood to include a direction vector located in the plane defined by the X and Z coordinates of illustrative coordinate system 48, whereas the longitudinal force FV may be understood to include a direction vector oriented in the Y coordinate, the Y coordinate being perpendicular to the X-Z plane of the illustrative coordinate system 48.

In one embodiment, by placing the support arm 45 at an approximate center of gravity of the containment vessel 24, a transverse force FH acting on the power module 25 tends to cause the containment vessel 24 to slide rather than rotate. Locating the support arm 45 on the containment vessel 24 at a particular height or position provides for controllability for how the containment vessel 24 will behave when it is subjected to one or more forces FH, FV, or RF.

The damping device 46 may compress in a vertical direction to absorb or attenuate the longitudinal force FV. In one embodiment, the damping device 46 compresses or flexes in a horizontal direction to attenuate the transverse force FH. The damping device 46 may be configured to slide along the mounting structure 47 within the X-Z plane during a seismic activity, such as an earthquake or explosion. Forces FV and FH may also be understood to result from thermal expansion of one or more components of the power module 25, including containment vessel 24 (FIG. 2), in any or all of the three dimensions X, Y, Z.

As a result of the compression or movement of the damping device 46, less of the forces FV and FH are transferred from the mounting structure 47 to the containment vessel 24, or from the containment vessel 24 to the mounting structure 47. The containment vessel 24 experiences less severe shock than what might otherwise be transferred if the support arm 45 were rigidly mounted to, or in direct contact with, the mounting structure 47. The containment vessel 24 may be configured to rotate about the horizontal axis X, due to a rotational force RF acting on the power module 25 (FIG. 3).

Support arm 45 may be rigidly attached to the containment vessel 24, wherein the one or more elastic damping devices 46 is located between, and in contact with, both the support arm 45 and the mounting structure 47 located in the liquid 36 (FIG. 2). The elastic damping device 46 may provide a pivot point between the support arm 45 and the support structure 47, wherein the containment vessel 24 pivots or rotates about the elastic damping device 46, similar to that illustrated by FIG. 3. The weight of the containment vessel 24 may be supported, in part, by a buoyancy force of the liquid 36. The surrounding liquid 36 (FIG. 2) also serves to attenuate any of the transverse force FH, longitudinal force FV, and rotational force RF acting on the containment vessel 24.

In one embodiment, the support arm 45 comprises a hollow shaft 29. The hollow shaft may be configured to provide a through-passage for an auxiliary or secondary cooling system. For example, piping 139 of FIG. 1 may exit the containment vessel 24 via the hollow shaft 29.

Figure 5:
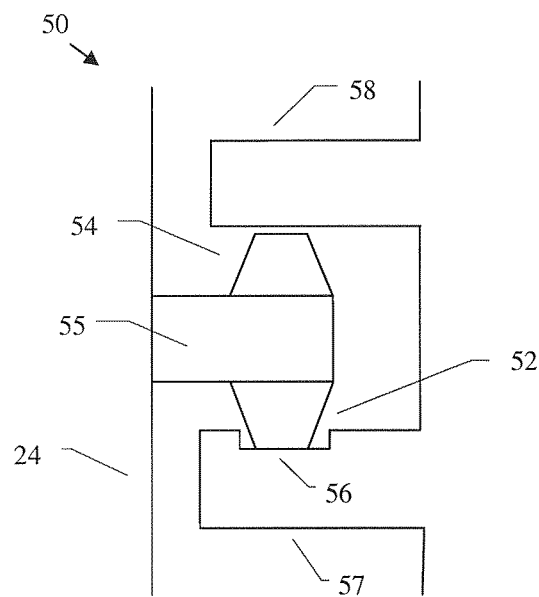
FIG. 5 illustrates a partial view of a support structure for a seismically isolated containment vessel comprising multiple elastic damping devices.

FIG. 5 illustrates a partial view of a support structure 50 for a seismically isolated containment vessel 24 comprising a support arm 55 and multiple elastic damping devices 52, 54. The first elastic damping device 52 is located between the support arm 55 and a lower mounting structure 57. The second elastic damping device 54 is located between the support arm 55 and an upper mounting structure 58. In one embodiment, the first and second elastic damping devices 52, 54 are mounted to or otherwise attached to the support arm 55. In another embodiment, one or both of the first and second elastic damping devices 52, 54 are mounted to the lower and upper mounting structures 57, 58, respectively.

At least a portion of the weight of the containment vessel 24 is transferred to the lower support structure 57 through the first elastic damping device 52. The first elastic damping device 52 may be under compression when the containment vessel 24 is at rest. The first elastic damping device 52 may be understood to attenuate longitudinal force acting between the support arm 55 and the lower mounting structure 57. The second elastic damping device 52 may also be understood to attenuate longitudinal force acting between the support arm 55 and the upper mounting structure 58. A longitudinal or vertical movement of the containment vessel 24 may be constrained by the lower and upper mounting structures 57, 58 as they come into contact with, or cause a compression of, the first and second elastic damping devices 52, 54, respectively. First and second elastic damping devices 52, 54 may provide similar functionality as a snubber or pair of snubbers in a conventional shock absorber.

In one embodiment, the lower mounting structure 57 comprises a recess 56. The recess 56 may be sized such that it has an interior dimension or diameter that is larger than an exterior dimension or diameter of the first elastic damping device 52. The first elastic damping device 52 is illustrated as being seated or located in the recess 56. The recess 56 may operate to constrain a movement of the containment vessel 24 in one or more lateral or transverse directions. The first elastic damping device 52 may compress or flex when it presses up against a wall of the recess 56. In one embodiment, the recess 56 may restrict an amount or distance that the first elastic damping device 52 is allowed to slide on the lower mounting structure 57 when the containment vessel 24 experiences lateral or transverse force.

Figure 6:
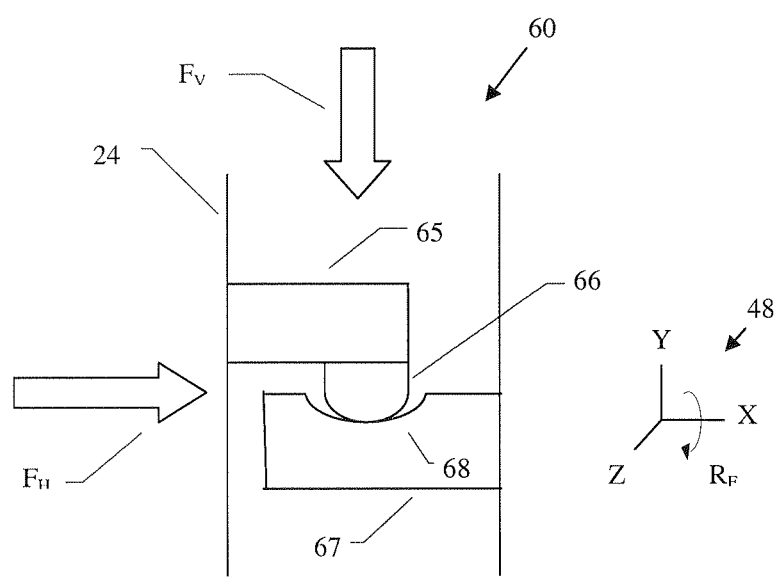
FIG. 6 illustrates a partial view of an elastic damping and retaining structure.

FIG. 6 illustrates a partial view of an elastic damping and retaining structure 60 for a seismically isolated containment vessel 24. The damping and retaining structure 60 comprises a deformable portion 66. The deformable portion 66 may be dome shaped, elliptical or hemispherical in shape. Mounting structure 67 comprises a recess 68, wherein the deformable portion 66 is seated or located in the recess 68. The deformable portion 66 and recess 68 may be understood to function similarly as a ball joint, wherein the deformable portion 66 rotates or pivots within the recess 68.

The recess 68 is illustrated as being concave in shape. The mounting structure 67 is configured to constrain a movement of the containment vessel 24 as a result of transverse force FH being applied in a lateral plane identified as the X-Z plane in the illustrative coordinate system 48. Additionally, the mounting structure 67 is configured to constrain a longitudinal movement of the containment vessel 24 as a result of a longitudinal force FV being applied in a direction Y perpendicular to the X-Z plane. The containment vessel 24 may be configured to rotate about the horizontal axis X, due to a rotational force RF acting on the power module 25 (FIG. 3). In one embodiment, the recess 68 forms a hemispherical, domed or elliptical bowl. A base skirt 30 (FIG. 2) located at the bottom end 28 of the containment vessel 24 may be configured to constrains a rotation of the containment vessel 24 as the deformable portion 66 pivots or rotates in the recess 68.

The mounting structure 67 may be configured to support some or all of the weight of the power module 25 (FIG. 2). In one embodiment, a buoyancy force of the liquid 36 supports substantially all of the weight of the power module 25, such that the recess 68 of the mounting structure 67 may primarily operate to center or maintain a desired position of the power module 25.

Figure 6A:
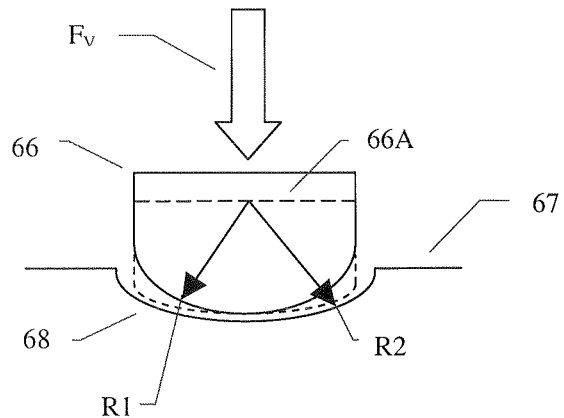
FIG. 6A illustrates a partial view of the elastic damping and retaining structure of FIG. 6 responsive to a longitudinal force.

FIG. 6A illustrates a partial view of the elastic damping and retaining structure 60 of FIG. 6 responsive to a longitudinal force FV. The recess 68 in the mounting structure 67 comprises a radius of curvature R2 that is greater than a radius of curvature R1 of the deformable portion 66 of the damping and retaining structure 60 when the containment vessel 24 (FIG. 6) is at rest. Longitudinal force FV may be applied to the support arm 65 (FIG. 6) as a result of vertical movement of the containment vessel 24, or as a result of force transmitted from the mounting structure 67 to the containment vessel 24. The longitudinal force may result from an earthquake or explosion for example.

When a dynamic longitudinal force FV is applied to the support arm 65, the damping device compresses from a static condition illustrated in solid lines by reference number 66, to a dynamic condition illustrated in dashed lines by reference number 66A. The radius of curvature of the deformable portion 66 temporarily approximates the radius of curvature R2 of the recess 68 in the dynamic condition 66A. As the effective radius of the deformable portion 66 increases, this results in an increased contact surface to form between the deformable portion 66 and the recess 68. As the contact surface increases, this acts to resist or decrease additional compression of the deformable hemispherical portion 66, and attenuates the longitudinal force FV. In one embodiment, the effective radius of curvature of the deformable hemispherical portion 66 increases with an increase in longitudinal force FV. When the dynamic longitudinal force FV has attenuated, the deformable portion 66 retains its original radius of curvature R1.

Figure 6B:
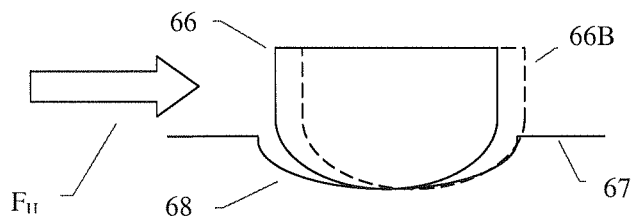
FIG. 6B illustrates a partial view of the elastic damping and retaining structure of FIG. 6 responsive to a transverse force.

FIG. 6B illustrates a partial view of the elastic damping and retaining structure 60 of FIG. 6 responsive to a transverse force FH. The recess 68 constrains a movement of the deformable portion 66 in at least two degrees of freedom. For example, the movement of the deformable portion 66 may be constrained in the X and Z directions of the illustrative coordinate system 48 of FIG. 6. The deformable portion 66 may compress or flex when it presses up against a wall of the recess 68. The compression or deformation of the deformable portion 66 attenuates the horizontal force FH. In one embodiment, the recess 68 may restrict an amount or distance that the deformable portion 66 is allowed to slide on the mounting structure 67 when the containment vessel 24 experiences transverse force FH. When a transverse force FH is applied to the support arm 65, the damping device moves or slides from the static condition illustrated in solid lines by reference number 66, to the dynamic condition illustrated in dashed lines by reference number 66B.

Whereas the recess 56, 68 are illustrated in FIGS. 5 and 6 as being formed in the mounting structure 57, 67, other embodiments include where the recess 56, 68 is formed in the support arm 55, 65, and wherein the damping device 52, 66 is mounted to the mounting structure 57, 67. These alternate embodiments may otherwise operate similarly as the embodiments illustrated in FIG. 5 or 6, to constrain movement of the containment vessel 24 in one or both of the transverse and longitudinal directions.

Figure 7:
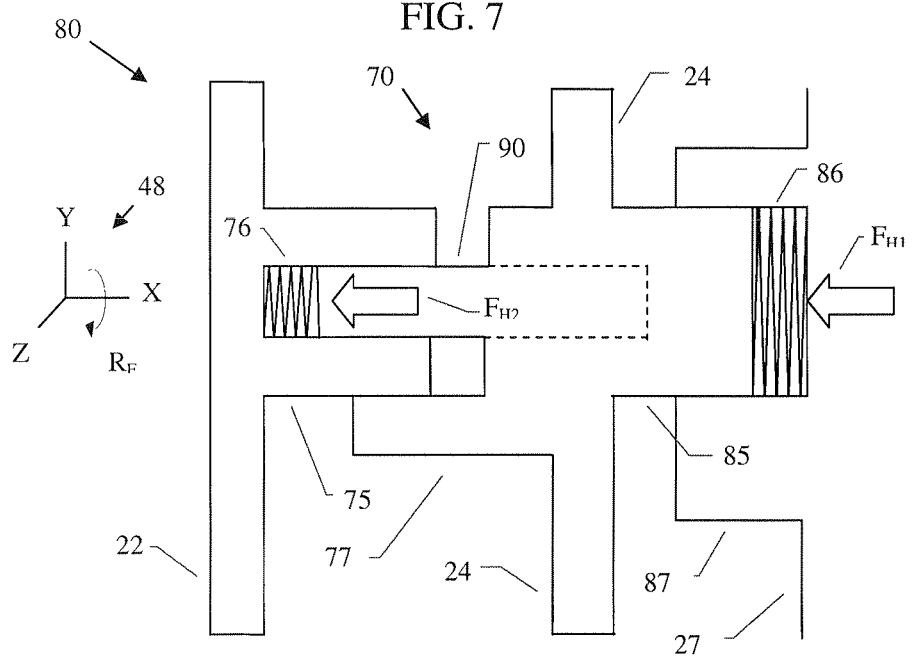
FIG. 7 illustrates a partial view of an elastic damping and retaining structure for a seismically isolated power module.

FIG. 7 illustrates a partial view of an elastic damping and retaining structure 70 for a seismically isolated power module 80. The power module 80 comprises a reactor vessel 22 and a containment vessel 24. The elastic damping and retaining structure 70 comprises one or more support arms, or trunnions, and one or more mounting structures. A first trunnion 75, protrudes or extends from the reactor vessel 22. The reactor vessel trunnion 75 provides similar functionality as one or more of the support arms described above with respect to FIGS. 2-6. A second trunnion 85 protrudes or extends from the containment vessel 24. The reactor vessel trunnion 75 lies along the same, single axis of rotation as the containment vessel trunnion 85. The axis of rotation X is shown in illustrative coordinate system 48. One or both of the reactor vessel 22 and containment vessel 24 may rotate about the axis of rotation X when a rotational force RF acts on the power module 25. The reactor vessel 22 and containment vessel 24 may rotate in the same or in opposite rotational directions from each other.

Reactor vessel trunnion 75 is shown supported on a first mounting structure 77. The mounting structure 77 protrudes or extends from the containment vessel 24. The reactor vessel trunnion 75 may move or slide along the mounting structure 77 when horizontal force FH1 or FH2 acts on the power module 80. A first damping element 76 acts to attenuate or reduce the impact of horizontal force FH2 transmitted by or between the reactor vessel 22 and containment vessel 24. The first damping element 76 also helps to center or maintain a respective position or distance between the reactor vessel 22 and containment vessel 24 when the power module 80 is at rest or in a static condition.

Containment vessel trunnion 85 is shown supported on a second mounting structure 87. In one embodiment, the mounting structure 87 protrudes or extends from a reactor bay wall 27. The containment vessel trunnion 85 may move or slide along the mounting structure 87 when horizontal force FH1 or FH2 acts on the power module 80. A second damping element 86 acts to attenuate or reduce the impact of horizontal force FH1 transmitted by or between the containment vessel 24 and the reactor bay wall 27. The second damping element 86 also helps to center or maintain a respective position or distance between the containment vessel 24 and the reactor bay wall 27 when the power module 80 is at rest or in a static condition.

The first damping element 76 is shown housed in the reactor vessel trunnion 75. A reactor vessel retaining pin 90 is located in the reactor vessel trunnion 75 to provide a contact surface for the first damping element 76. The reactor vessel retaining pin 90 may be an extension of the containment vessel 24 or the containment vessel trunnion 85, for example. In one embodiment, the reactor vessel retaining pin 90 is rigidly connected to the containment vessel 24. The reactor vessel retaining pin 90 may extend through both sides of the containment vessel 24.

Horizontal force FH2 may be transmitted by or between the reactor vessel 22 and the containment vessel 24 via the reactor vessel retaining pin 90 and the first damping element 76. Vertical movement of the reactor vessel 22 and containment vessel may be constrained by the interaction between the reactor vessel trunnion 75, reactor vessel retaining pin 90, and the mounting structure 77. Vertical movement of the reactor vessel 22 and containment vessel 24 may be further constrained by the interaction between the containment vessel trunnion 85 and the mounting structure 87.

The elastic damping and retaining structure 70 may further operate to provide a thermal buffer for the power module 80. In addition to attenuating, damping, or otherwise reducing dynamic and seismic forces from being transferred to or between the components of the power module 80, the elastic damping and retaining structure 70 may reduce the thermal heat transfer between the reactor vessel 22 and the containment vessel 24. For example, one or both of the first and second mounting structures 77, 87 may be lined with thermal insulation.

Figure 8:
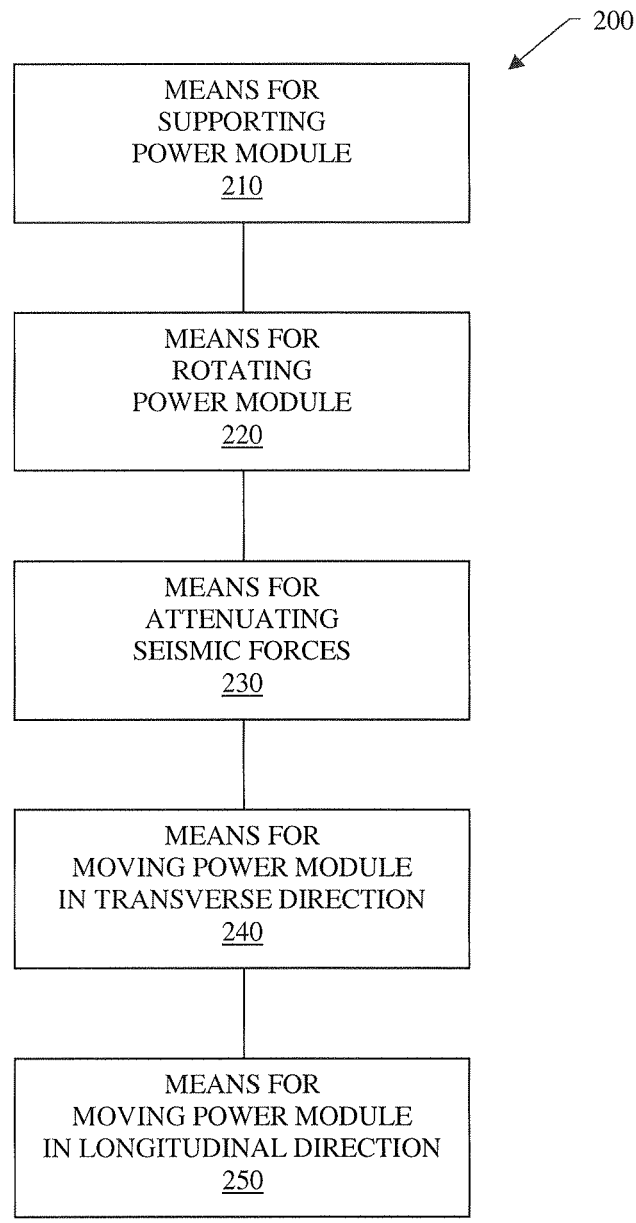
FIG. 8 illustrates a novel system for seismically isolating a power module.

FIG. 8 illustrates a novel system 200 for seismically isolating a power module. The system 200 may be understood to operate with, but not limited by, means illustrated or described with respect to the various embodiments illustrated herein as FIGS. 1-7.

At operation 210, a power module is supported on a support structure. The support structure may be located at or slightly above an approximate midpoint, or an approximate center of gravity, of the power module.

At operation 220, rotation of the power module is constrained. The support structure may serve as a pivot for the rotation.

At operation 230, seismic forces transmitted through the support structure to the power module are damped or attenuated. In one embodiment, the seismic forces are attenuated by a damping device comprising an elastic material.

At operation 240, movement of the power module in one or more transverse directions is constrained within a fixed range of motion. Upon an attenuation of a transverse force, the power module returns to its original at-rest position. In one embodiment, the damping device comprises a rounded surface, and the support structure comprises a rounded recess configured to house the rounded surface.

At operation 250, movement of the power module in a longitudinal direction is constrained within a fixed range of motion. Upon an attenuation of a longitudinal force, the power module returns to its original at-rest position. The longitudinal directional is perpendicular to the one or more transverse directions of operation 240.

Although the embodiments provided herein have primarily described a nuclear reactor, it should be apparent to one skilled in the art that the embodiments may be applied to other types of power systems as described or with some obvious modification.

Dimensions of the figures are not provided to scale, and in some cases certain features have been exaggerated in scale in order to illustrate or describe certain details. Other rates and values may be determined through experimentation such as by construction of full scale or scaled models of a nuclear reactor.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A power module comprising:
a containment vessel completely submerged in a pool of liquid;
a reactor vessel housed in the containment vessel; and
a support structure that comprises support arms coupled to opposed sides of the containment vessel, the support structure located at an approximate midpoint of the containment vessel and configured to rotate at least one of the reactor vessel or the containment vessel about an axis that extends between the support arms and through the approximate midpoint of the containment vessel, the power module supported by the support structure in combination with a buoyancy force of the pool of liquid acting on the containment vessel.

2. The power module according to claim 1, wherein the support structure is located at or slightly above the approximate center of gravity of the power module.

3. The power module according to claim 1, further comprising a first damping device interposed between the reactor vessel and the containment vessel, and
a second damping device interposed between the containment vessel and a pool wall, wherein the first and second damping devices are configured to attenuate a dynamic force acting on the power module.

4. The power module according to claim 1, wherein the pool of liquid is disposed below a terranean surface.

5. The power module according to claim 1, wherein the containment vessel is configured to slide in a substantially lateral direction in response to a lateral force acting on the containment vessel.

6. The power module according to claim 1, wherein the support structure comprises a first support structure disposed on a first side of the containment vessel, and
wherein the power module further comprises a second support structure disposed on a second side of the containment vessel opposite the first side.

7. The power module according to claim 1, wherein the support structure comprises an elastic damping device.

8. The power module according to claim 7, wherein the support arms are rigidly attached to the containment vessel, and wherein the elastic damping device is located between and in contact with one of the support arms and a mounting structure in the pool of liquid.

9. The power module according to claim 8, wherein the elastic damping device compresses in response to the support arm and the mounting structure being pressed together, and
wherein the elastic damping device exerts a reactionary force against at least one of the support arm and the mounting structure in response to the support arm and the mounting structure being pressed together.

10. The power module according to claim 8, further comprising a pivot at an interface between the support structure and the mounting structure.

11. The power module according to claim 10, wherein the pivot is located at or near the elastic damping device, and
wherein the containment vessel is configured to rotate about the pivot in response to a rotational force acting on the containment vessel.

12. The power module according to claim 8, wherein the mounting structure is rigidly coupled to a reactor bay at least partially enclosing the pool of liquid, and
wherein the mounting structure extends from a substantially vertical wall of the reactor bay to a location in the pool of liquid between the substantially vertical wall and the containment vessel.

13. The power module according to claim 12, wherein the support arm comprises a hollow shaft.

14. The power module according to claim 12, wherein the mounting structure comprises a recess configured to receive a portion of the elastic damping device.

15. The power module according to claim 8, further comprising a base skirt located at a lower end of the containment vessel, wherein the containment vessel is configured to pivot about the support arm, and wherein the base skirt is configured to contact an alignment device in the pool of liquid if the containment vessel pivots about the support arm.

16. The power module according to claim 15, wherein the base skirt is rigidly coupled to the lower end of the containment vessel around a circumference of an outer surface of the containment vessel.

17. The power module according to claim 15, wherein the alignment device extends into the pool of liquid from a bottom surface of a reactor bay at least partially enclosing the pool of liquid, and
wherein a top portion of the alignment devices is disposed within a volume defined by the base skirt.

18. The power module according to claim 17, further comprising at least one dampener disposed between the top portion of the alignment device and the base skirt, and within the volume of the base skirt.

19. The power module according to claim 18, wherein the dampener compresses in response to contact between the alignment device and the base skirt, and
    wherein the dampener exerts a reactionary force against at least one of the alignment device or the base skirt in response to the contact.

* * * * *